US010242004B2

(12) United States Patent
Deschenes et al.

(10) Patent No.: US 10,242,004 B2
(45) Date of Patent: Mar. 26, 2019

(54) METHOD FOR AUTOMATICALLY TAGGING DOCUMENTS WITH MATRIX BARCODES AND PROVIDING ACCESS TO A PLURALITY OF SAID DOCUMENT VERSIONS

(71) Applicant: Knova Web Technologies, Inc., Montreal (CA)

(72) Inventors: Gabriel Deschenes, Repentigny (CA); Alexandre Gagnon-Demers, Gatineau (CA); Julien Leroux, Repentigny (CA)

(73) Assignee: Knova Web Technologies, Inc., Montreal (CA)

( * ) Notice: Subject to any disclaimer, the term of this patent is extended or adjusted under 35 U.S.C. 154(b) by 0 days.

(21) Appl. No.: 15/465,215

(22) Filed: Mar. 21, 2017

(65) Prior Publication Data
US 2017/0322932 A1 Nov. 9, 2017

Related U.S. Application Data

(63) Continuation of application No. 14/353,134, filed as application No. PCT/CA2012/000145 on Feb. 17, 2012.

(60) Provisional application No. 61/548,791, filed on Oct. 19, 2011.

(51) Int. Cl.
| | |
|---|---|
| *H04L 29/06* | (2006.01) |
| *G06F 17/30* | (2006.01) |
| *G06K 17/00* | (2006.01) |
| *G06F 17/22* | (2006.01) |
| *G06F 21/62* | (2013.01) |
| *G06K 19/06* | (2006.01) |

(52) U.S. Cl.
CPC .... *G06F 17/30014* (2013.01); *G06F 17/2288* (2013.01); *G06F 17/30011* (2013.01); *G06F 17/30879* (2013.01); *G06F 21/6209* (2013.01); *G06K 17/0016* (2013.01); *G06K 19/06112* (2013.01)

(58) Field of Classification Search
CPC ........ G06F 17/30725; G06F 17/30879; G06F 17/30855; G06F 17/30876
See application file for complete search history.

(56) References Cited

U.S. PATENT DOCUMENTS

| | | | | |
|---|---|---|---|---|
| 9,239,863 B2* | 1/2016 | Zhu | ............ | G06F 17/30879 |
| 9,489,465 B2* | 11/2016 | DeRoos | ............ | G06Q 10/06 |
| 9,721,260 B2* | 8/2017 | Chatelain | ............ | G06Q 10/06 |
| 2001/0011283 A1* | 8/2001 | Kato | ............ | G06F 17/30017 |
| | | | | 715/255 |
| 2012/0036226 A1* | 2/2012 | Chor | ............ | G06F 17/30879 |
| | | | | 709/219 |

(Continued)

*Primary Examiner* — Chau Le
(74) *Attorney, Agent, or Firm* — Benoit & Cote Inc.; Michel Sofia

(57) ABSTRACT

A method of tagging a document for future access, the method comprising the steps of: (a) Saving a document on a server, (b) Accessing said document by a tagging process program, (c) Having said tagging process program: (i) generate a tag referring to the location of said document on said server; and (ii) add said tag to said document, while said tag being visible on the printed version of the document, wherein, said tag can be scanned by a device equipped with an optical scanner and as a result said document would be accessible to said device.

16 Claims, 8 Drawing Sheets

(56) References Cited

U.S. PATENT DOCUMENTS

| | | | |
|---|---|---|---|
| 2012/0218471 A1* | 8/2012 | Gratton | H04N 21/2541 348/564 |
| 2014/0331335 A1* | 11/2014 | Deschenes | G06K 17/0016 726/28 |
| 2014/0367464 A1* | 12/2014 | Herzig | G06K 1/121 235/375 |
| 2016/0026626 A1* | 1/2016 | Beadles | G06F 17/30011 707/756 |
| 2016/0196484 A1* | 7/2016 | Ciavatta | G06F 17/30879 235/462.1 |

* cited by examiner

METHOD FOR AUTOMATICALLY TAGGING DOCUMENTS WITH MATRIX BARCODES AND PROVIDING ACCESS TO A PLURALITY OF SAID DOCUMENT VERSIONS

CROSS REFERENCE TO RELATED APPLICATIONS

This application is a Continuation Application of U.S. Ser. No. 14/353,134, filed Jul. 14, 2014, which is a § 371 national stage entry of International Application No. PCT/CA20121000145, filed on Feb. 17, 2012, which claims priority to U.S. Provisional Application No. 61/548,791, filed on Oct. 19, 2011, the entireties of which are incorporated herein by reference.

FIELD OF THE INVENTION

The invention relates to a method which is supported by an informatics system, which allows an automated identification of a document by a matrix barcode (also known as 2D code). The method further makes it possible to access files stored on a server corresponding to the matrix barcode on a paper document.

More specifically, the invention allows a transmission of a copy of file stored on the server by obtaining its location from a single sheet of paper by matrix barcodes. This transmission is made possible by inserting into a document a matrix barcode, identifying the said document and the path to this document on the server. This insertion of the matrix barcode is done by a computerized automated tagging process.

BACKGROUND OF THE INVENTION

Historically, the exchange of documents between two or several persons was achieved in three ways: physically, virtually and transitory (whereas the document is transmitted partly physically and partly virtually). The documents existed in two formats, the paper document and the virtual format (such as computer files).

When two or more persons exchanged virtual documents physically, it was done by transferring information using a USB device, a CD or other media physical media containing virtual documents. The exchange then involved a physical device that was transferred from one person to another.

More recently, computer systems and networks have facilitated the exchange of virtual documents using devices such as computers, smart phones, or iOS™ products. The exchange of information may also be accomplished by email, with the possibility of attaching files or use of other FTP services. Such transfers are virtual exchanges.

A transitory exchange is a combination of the virtual and physical formats. One example is the use of a fax for the transfer of information. Information in the virtual form is delivered (the electronic file) in a physical form (the sheet of paper) by the fax.

SUMMARY OF THE INVENTION

One object of the present invention is to provide the transmission of an electronic file (or documents) via a physical support. The creation of a file code type allows a user to send several files from a unique paper document to another user in an electronic format. The file code provides supplementary information (represented by a set of files) attached to a single document. The process allows a file to be sent from a distant server to a smart phone or tablet computer after the processing of the matrix barcode by the server. The server where the file are stored (herein the "storage server") may be a cloud storage service, or any other type of storage server accessible through Internet or other computer networks, private or public.

According to the present invention, a barcode is attached in an automated manner to a file or document. This automated attachment is performed by a computerized application identified herein as the "process monitor".

The method allows monitoring of the file requests through a management of passwords specific to each matrix barcode. The use of a password allows control by the owner of the documents regarding the broadcasting of said document, levels of access to the document and extent of editing of the document.

Furthermore, in some embodiments of the invention, the documents can be transferred to the e-mail address of the user requiring access of the document. The web server can therefore create a database of users' e-mail addresses for users having requested access to the documents.

According to one aspect of the invention there is provided a method of tagging a document for future access. The method is automated and does not require human intervention. The method includes steps of: uploading of a file by the user on a web server (or internet hosting platform); hosting a file containing said document using said internet web server; downloading of said file by a process server once it has been detected by the process monitor; uploading of said file on a storage server; memorization of access path by the web server to said file in the form of an web link; memorization of parameters chosen by the user by the process monitor; associating tagging parameters to said file, wherein tagging parameters include access restriction parameters; downloading (transferring) said file and said associated tagging parameters from the said internet hosting platform (web server) to a storage server and replacing the temporary copy by said file containing the tagging parameters in the storage server. Memorization steps are methods allowing safekeeping of the information such as the tagging parameters and access in a database.

In such embodiments, the process monitor continuously searches in the web server to identify said file to be tagged which are stored on the storage server, and once the process monitor identifies said file to be tagged, the process monitor download said file to be tagged from said storage server to a process server, this way the process monitor is generating an access path to said file on said storage server using a web link. The web server contains a database comprised of web pointers (a pointer that indicate the location on internet of the document) and tagging parameters set by the user. The file pointer contains the access path to the file to be tagged. The tagging parameters may include the page of the document on which the matrix barcode is to appear, the position of the matrix barcode on this page and other such tagging parameters.

The method also has steps of creating a matrix barcode tag referring to said access path; inserting the matrix barcode tag into the said file according with said tagging parameters, wherein said matrix barcode will appear on said document; uploading (transferring) said file with inserted matrix barcode tag to said storage server at the location corresponding to said access path.

Transferring, copying, downloading and uploading files from one server to another server, or from or to the user's device, can be in push or get mode. Such actions can be performed over diverse internet protocols. These terms are therefore interchangeable for the purpose of the present invention.

In a preferred embodiment, the method also comprises an access restriction parameters include a user-defined password; the step of providing access to said file located on said access path only to third party users providing said password.

In preferred embodiments, the method uses the QR™ code (Quick Response) technology as matrix barcode. QR™ are a type of matrix barcode that already exists and is well known in various commercial applications. QR codes are available in several versions, each able to represent a certain number of alphanumerical characters in the form of a 2D barcode. This technology utilizes a two-dimensional barcode able to store information. As an example, QR™ code of version 1 can represent a string of up to 25 alphanumerical characters, while codes of version 40 can represent a string of up to 4296 alphanumerical characters. QR™ barcodes are also able to store numerical, binaries and Kanji/Kana characters. Fur the purpose of the present invention, the QR™ code contains the alphanumerical string which constitutes the hyperlink location (also known herein as "access path") of the document of the tagged document on the storage server. This two-dimensional code must be read by a QR™ code reader, which is often included in devices such as a smart phone. The QR code does not need to be specific to the present invention. The method then includes an automatic attachment of a QR™ code to an electronic document (for example, documents in the following format: Word™ 97-2003, Word™ 2007, bitmap, tiff, jpg, png, pdf, PowerPoint™ 97-2003, PowerPoint™ 2007, Excel™ 97-2003, Excel™ 2007 and other documents in digital format). This automatic attaching is performed by the process monitor.

As can be understood by a person skilled in the art, any other type of matrix barcode which is able to contain alphanumerical strings adequate for the purpose of indicating the location of a the tagged file or folders on the storage server could be use for the present invention.

The invention's internet hosting platform hosts the documents at a unique location on a storage server which allows the identification of the document by the user. While the storage server is hosting the document, the web server continuously searches the database to identify a new file to tag. When a file is identified as being a file to be tagged, the process monitor retrieves the file by downloading it from the storage server (as on FIG. 1) to the server of the process monitor (the process server). The process monitor allows the retrieving of the initial file from the user and allows the tagging parameters to be seen by the user. Furthermore, the process monitor creates the matrix barcode by converting the hyperlink directing to the anticipated location of the tagged document on the storage server into a matrix barcode, which is generated by a sub-process of the invention. The matrix barcode is inserted by the process monitor into the file. Finally, the process monitor returns the said file now containing the matrix barcode to the storage server (on FIG. 1). Once the file is tagged and returned to the hosting server by the process monitor, the monitor resumes the search in the database for files to be tagged and remains available to the user for downloading.

When another user wants to access the document using a device, reading of said matrix barcode by an appropriate reader such as a smart phone device allows him to obtain a copy of the document from the server on their personal devices. A reader must be able to decode the matrix barcode and extract information on the location of the tagged document on the storage server from said barcode. Several other users can access the same document using different viewing devices, such as tablet computers, handheld computers and Smartphone's.

In alternative embodiments, a barcode, including a matrix barcode or single dimension barcode (such as a UPC-A barcode), can be affixed to the document according to the invention. The barcode then contains an identification code instead of the hyperlink itself. This identification code is matched in a database hosted on the internet hosting platform with the corresponding hyperlink location of the tagged document on the storage server. When the user requires access to the document by scanning the barcode, the user's device queries the internet hosting platform by sending the identification code from the barcode. The internet hosting platform then returns the hyperlink location of the tagged document to the user's device. The user's device can then use this hyperlink to access said tagged document. In such embodiment, the reader on the user's device must be of a specifically programmed to access the internet hosting platform to retrieve the hyperlink location corresponding to the barcode on the printed document.

In yet another alternative embodiment, the user's device used access the document may contain a barcode reader specifically programmed for the present invention. When the device reads the barcode (matrix barcode or single dimension barcode, including a UPC-A barcode), the reader within the device concatenate the file location or identifier on the server from the barcode. The reader then affix the file location on the server to the server web address in order to construct the hyperlink to the tagged document on the storage server. The reader then accesses the constructed hyperlink to allow user access to the document in accordance with the present invention. In such embodiment, the reader on the user's device must be of a specifically programmed to affix the concatenated document identifier with the server location in order to construct a complete hyperlink location of the document from the barcode on the printed document.

The method further comprises a feature a coordination of different versions of a same file on a internet hosting platform and on the storage server. The versions system allows the user to have access to a single file directory containing the actual and all the previous versions of the file, the latest version being the final version. The owner of the content of the initial file can invite another user and therefore share access to said file using the internet hosting platform. When a recipient receives an invitation, if he accepts, three types of content presentation will be presented, either i) a web page where the recipient sees a list of file versions or documents to choose from, i) a web page asking the user to choose between a password or for the documents to be sent by email or iii) a web page asking for a password, which then gives access to the web page described in (i) herein above. The acceptation of the recipient allows for the system to add his identification parameters to the accessed file. It further allows the recipient to add other versions of the file on the storage server.

Alternatively, the method further comprises a feature which tags all documents of a folder on the internet hosting platform and on the storage server. This feature allows the user to have access to a directory containing a plurality of documents. The owner of the content of the folder can invite another user and therefore share access to said folder using the internet hosting platform. When a recipient receives an invitation, if he accepts, three types of content presentation will be presented, either i) a web page where the recipient sees a list of files or documents to choose from, i) a web page asking the user to choose between a password or for all the files and documents of the folder to be sent by email or iii) a web page asking for a password, which then gives access to the web page described in (i) herein above. The acceptation of the recipient allows for the system to add his identification parameters to the accessed folder. It may further allow the recipient to add other documents or other versions of the displayed documents on the storage server.

A function exists where it is possible for the recipient to have access to all the versions of the same file, whereas the owner of the initial file has activated said function. A list of versions refers to several documents corresponding to different versions containing the modifications made to an initial document, enumerated as a list shown to the user when said user chooses this option. A list of documents refers to different documents without the same content and with no relation to one another, in contrast with different versions of an initial document.

In yet another alternative embodiment, the tagging process is done in conjunction with the software used for editing the document on the document owner's device. The user downloads from a website an application which constitutes an add-on feature. This feature allows the owner of the document to tag its document directly within the application used for editing the document using a process monitor installed on the user's device, herein called "native monitor". The method comprises the steps of the user clicking to start the add-on native monitor on the editing software; the choosing of different parameters by the user, such as the location of the matrix barcode on the document or of the pages to receive the matrix barcode; the sending of a query from the native monitor to the web server to add the user's parameters in the content of the document, and to create a matrix barcode; the receiving of the information from the web server, including the user's parameters and the matrix barcode by the native monitor on the user's device; the creation of a hyperlink corresponding to the location on the storage server corresponding to the matrix barcode; the download of the tagged document from the user's device by the native monitor to the web server; the download of the tagged document from the web server to the storage server at the location of said hyperlink. When the user uses the add-on feature for a new document, the web server application automatically generates a matrix barcode (such as a QR™ code) to be tagged on said document and said hyperlink is generated by the web server application to access the tag document on the storage server through the use of said matrix barcode. When the owner of the document saves the document using the add-on application, the native monitor downloads a copy of the file of the document to the storage server at the location corresponding to the hyperlink. Also, the native monitor can save a copy of tagged file on the document owner's device used for editing.

According to one aspect of the invention there is provided a method of tagging a document for future access. This method has the following steps of:
 (a) Saving a document on a server.
 (b) Accessing said document by a tagging process program.
 (c) Having said tagging process program:
   (i) generates a tag referring to the location of said document on said server;
   (ii) adds said tag to said document, while said tag being visible on the printed version of the document. Later, said tag can be scanned by a device equipped with an optical scanner and as a result said document would be accessible to said device.

According to yet another aspect of the invention there is provided a method of tagging a document for future access, the method having the following steps:
 (a) hosting a file containing said document using an internet hosting platform;
 (b) associating tagging parameters to said file;
 (c) transferring said file and said associated tagging parameters from the said hosting platform to a storage server;
 (d) creating an entry in a database on said hosting platform identifying the location of said file on said storage server;
 (e) monitoring said file and said tagging parameters by a process monitor, wherein said process monitor continuously searches in said database to identify said file to be tagged, and once the process monitor identifies said file to be tagged, the process monitor transfers said file to be tagged from said storage server to a process server;
 (f) generating an access path to said file on said storage server using a web link;
 (g) creating a barcode tag referring to said access path;
 (h) inserting the barcode tag into the said file according with said tagging parameters, wherein said barcode will appear on said document;
 (i) transferring said file with inserted barcode tag to said storage server at the location corresponding to said access path;

Preferably wherein the steps (e), (f), (g), (h) and (i) are performed by an automated software application which operates on a process server.

Preferably, in the said method the tagging parameters include access restriction parameters. More preferably, said access restriction parameters may include a user-defined password; while said method further comprises the step of providing access to said file located on said access path only to third party users providing said password.

According to another embodiment of the invention, said method comprises subsequent steps of:
 Creating one or a plurality of different versions of said documents which include said barcode.
 Hosting said versions of said document on said internet hosting platform.
 Transferring said further versions from said hosting platform to said storage server.
 And having a selection webpage at said access path for users accessing said access path to select which version of said document to transfer.

Preferably, said barcode is a matrix barcode representing the hyperlink location of said document on said storage server.

According to further embodiment of the invention, the document retrieval method comprising the steps of:
 reading said matrix barcode with an application for reading barcode on a viewing device;
 said viewing device transferring said document from said access path; and
 displaying said document on said viewing device.

Preferably, the document retrieval method, when the access restriction parameters include a user-defined password; further having the steps of:
 reading said matrix barcode with an application for reading barcode on a viewing device;
 said viewing device requesting access to said document at said access path;

said storage server requesting said password from the viewing device;
said viewing device providing said password to said storage server;
said viewing device transferring said document from said access path; and
displaying said document on said viewing device.

According to yet another aspect of the invention there is provided a method wherein the said barcode refers to document location on said storage server;
said storage server being associated with a hyperlink address;
and the document retrieval process further comprising the steps of:
  reading said barcode with an application for reading barcode on a viewing device;
  said application concatenating said document location on said storage server from said barcode;
  said application constructing said access path from said document location and said hyperlink address;
  said viewing device transferring said document from said access path; and
  displaying said document on said viewing device.

According to yet another embodiment, the previously described method further has a barcode which refers to a reference in a database on said internet hosting platform; said reference in said database corresponds to said access path of said document; and further document retrieval process comprising the steps of:
  reading said barcode with an application for reading barcode on a viewing device;
  said application querying said internet hosting platform to obtain said access path of said document from said database;
  said viewing device transferring said document from said access path; and
  displaying said document on said viewing device.

According to still another aspect of the invention, there is provided a method of tagging a plurality of documents for future access, the method having the steps of:
  hosting a plurality of files, each containing one of said document using an internet hosting platform;
  associating tagging parameters to said files;
  transferring said files and said associated tagging parameters from the said hosting platform to a storage server;
  creating an entry in a database on said hosting platform identifying the location of said files on said storage server;
  monitoring said files and said tagging parameters by a process monitor.

Further, said process monitor continuously searches in said database to identify said files to be tagged, and once the process monitor identifies said files to be tagged, the process monitor transfers said files to be tagged from said storage server to a process server the process having the steps of:
  generating an access path for a selection webpage on said storage server using a web link;
  creating a barcode tag referring to selection webpage;
  inserting the barcode tag into each said file according with said tagging parameters, wherein said barcode will appear on each said document;
  transferring said files with inserted barcode tag to said storage server at the location corresponding to web links of said selection webpage.

BRIEF DESCRIPTION OF THE FIGURES

For a fuller understanding of the nature, object and advantages of the invention, reference should be made to the following detailed description cross-referencing as well as the drawings mentioned hereinafter.

DETAILED DESCRIPTION

In a preferred embodiment, the functionality of the creation of the code type file regroups several files under a same pointer allowing faster access by one scan of the matrix barcode to a set of files using one scan. The creation of a password is offered as an option to the user for each matrix barcode generated by the invention, allows selecting the user of the document by the presence of a security wall that requests the password to access the electronic copy of the document. The same function allows the insertion of a filter that gives access to a group of individuals previously selected and that are using a unique password. A password may define the level of access to the document in which parts of the document would not be visible to the general public. A password may define the editing allowed for each document such as read only mode, prevention from copying of parts of the document and prevention from saving of the document on external devices.

Figure 1:
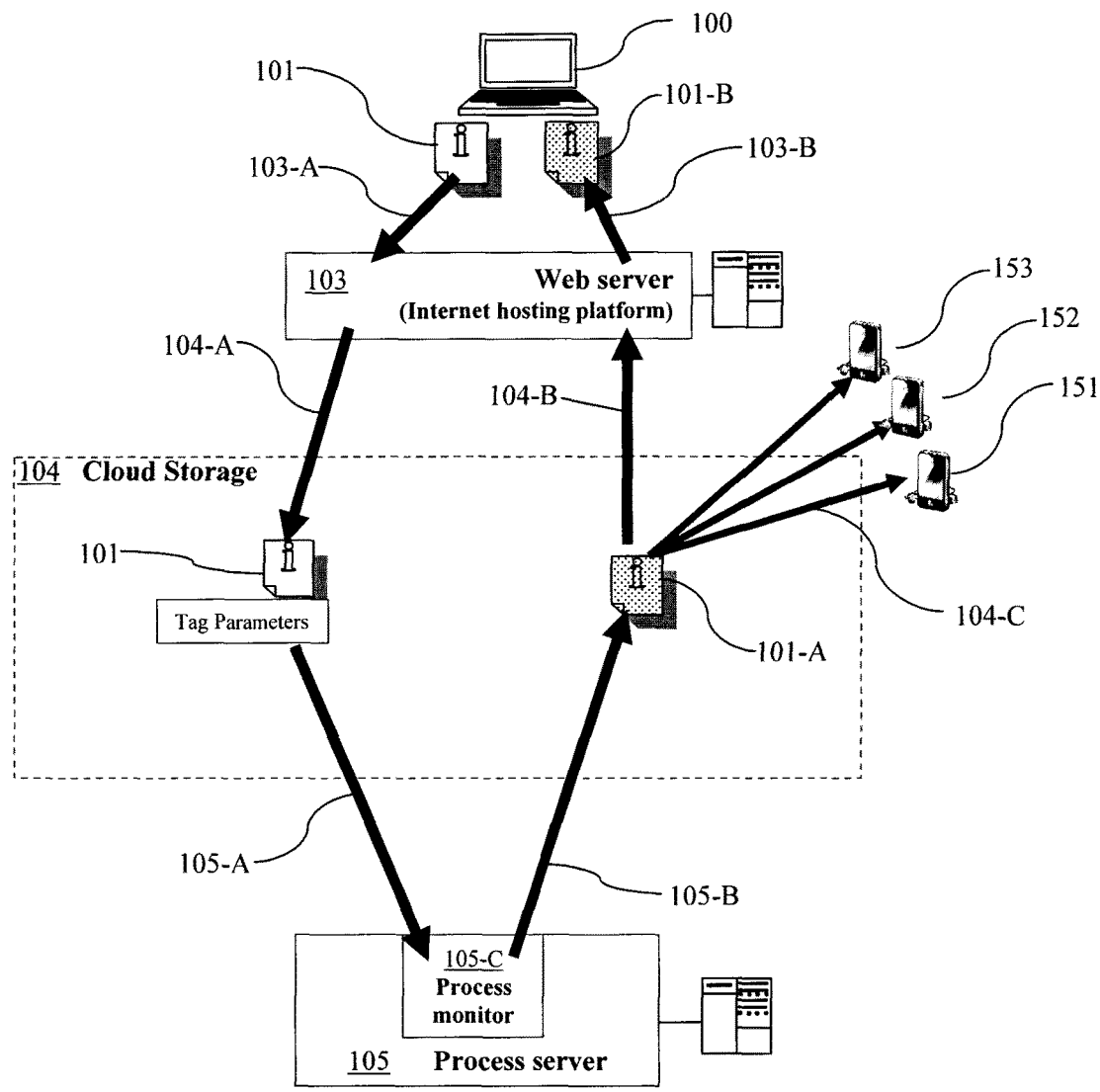
FIG. 1 is a schematic illustration of the method to tag a file in accordance with the present invention.

Referring to FIG. 1, a user (the document's owner) may select one or more documents, from his computer (100) to be tagged. This file is called «initial» and is represented (101). The types of «initial» files recognized by the method can be files generated by applications such as Microsoft Office™, Open Office™, PDF editors, image files (bitmap, jpeg, png, tiff) files and the Apple iWork™ files. Once the documents are selected, the user, may, without any obligation, personalize the tagging parameters to be used for the said selected document.

The file is then downloaded alongside with the tagging parameter (103-A) to the web server (103), which in turns download said file and tagging parameters to a storage server, such as a cloud storage (104). The process monitor (105-C), located on the process server (105) downloads (105-A) the file and tagging parameters from the storage server (104) to the process server (105). The process monitor (105-C) then proceed to tagging the document. The tagged document is uploaded (104-B) automatically by the process monitor (105-C) from the process server (105) to the storage server (104).

Once the tagged document (101-A) is on the storage server (104), the process monitor may be downloaded (103-B) by the web server (103) and then copied (103-B) to the document's owner computer (100), so a copy of the tagged document (101-B) remains on the document's owner computer (100). As can be understood by a person skilled in the art, such copy of the tagged document (101) may be attributed a different name on the user's computer in order to distinguish it from the initial file (101), for example adding an identifier word such as "tagged" in the file name. Alternatively, the initial document (100) may be renamed or deleted, while the tagged document (101-C) replaces it on the user's computer, using the initial document's name.

Alternatively, once the tagged document (101-A) is on the storage server (104), the user may only receives the hyperlink where the tagged document (101-A) is stored on the storage server (104). The user can then download the tagged document on his computer (100) using said hyperlink.

The user's computer (100) may be a laptop computer, a desktop computer, a tablet PC, a handheld computer, a terminal, a programmable printer or any other such device able to handle the exchanges to and from the web server. For example, one such device could be a multi-functional programmable printer (such as commercially available HP ePrint™ printers) which can be connected to Internet via a Wi-Fi™ or a regular wire connection and which can be programmed to process the documents to be printed to add a QR tag using the present invention.

In such cases, the printer receives a document to be printed from another device. Once it receives a document, the printer is programmed to automatically transfer the document to the web server (103). The document is then tagged in accordance with the present invention as illustrated in FIG. 1, and then returned from the Web server (103-B) to the printer (100). The printer is then programmed to automatically print the tagged document (101-B).

Figure 1A:
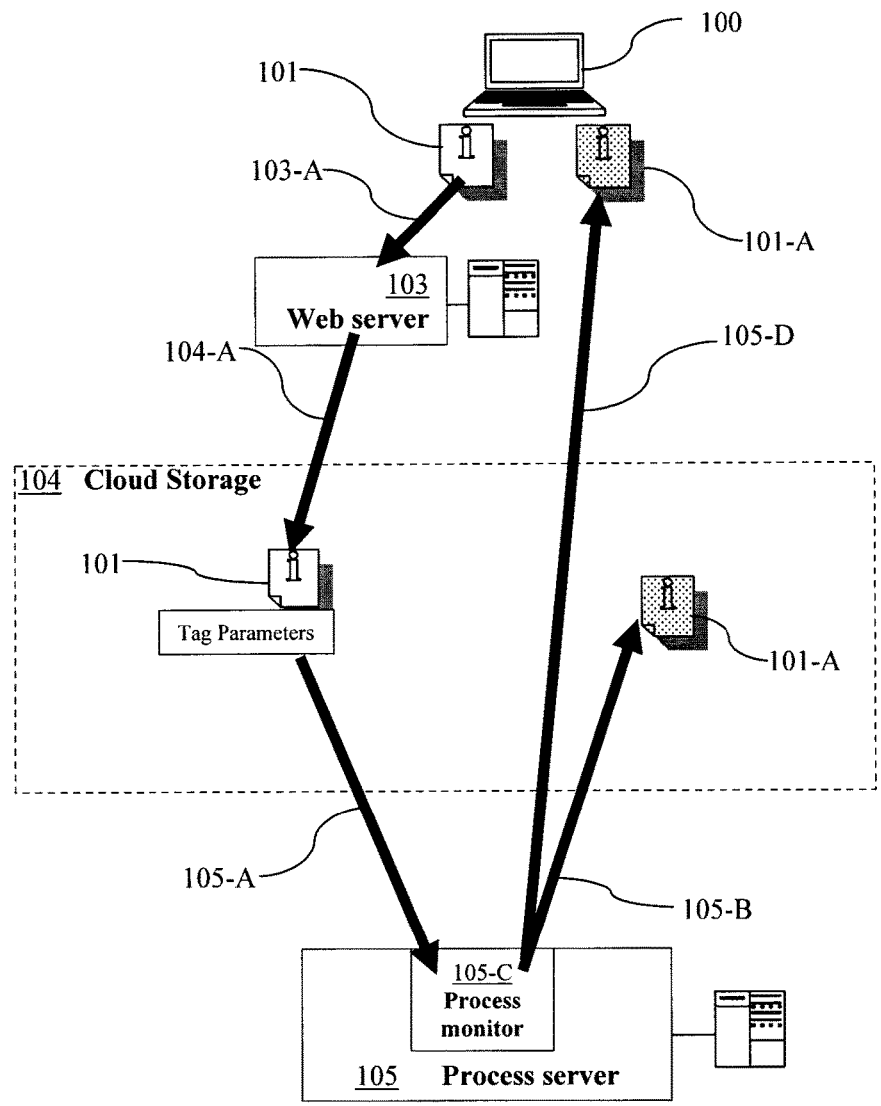
FIG. 1A is a schematic illustration of a sub-process of the method of FIG. 1, whereas the process monitor uploads directly the tagged file to the user computer.

FIG. 1A shows a variant embodiment whereas the tagged document (101-A) is uploaded (105-B) by the process monitor from the process server (105) to the storage server (104) and also uploaded (105-C) by the process monitor from the process server (105) directly to the user's computer (100).

Figure 2:
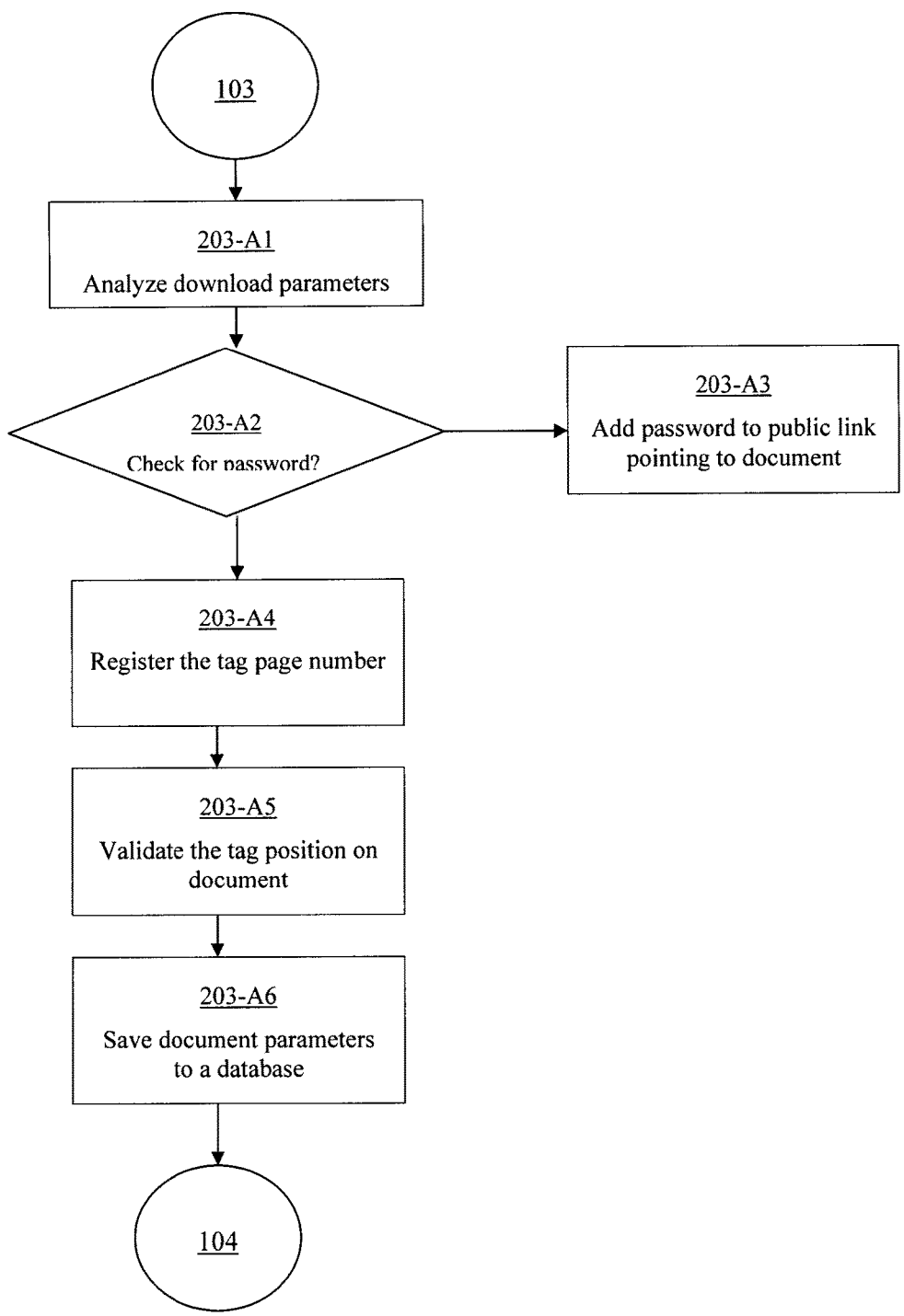
FIG. 2 shows a schematic diagram representing data capture of tagging process when uploading a new document.

FIG. 2 demonstrates the tagging parameters analysis that is performed in some embodiments by the web server (103), and allow for a verification of the given parameters (203-A1) in order to allow the verification of the presence or absence of a password (203-A2), the page on which the code is applied (203-A4) and also the positioning of the tag (203-A5). Furthermore, in the database of these parameters is associated to the document as illustrated at (203-A6). Once the parameters are confirmed, the initial document and its chosen parameters are downloaded on the storage server (104). It is possible, if required by the user, to add a password to control access to the hyperlink location of the document (203-A3).

The web server illustrated in FIG. 1 (103), a host dedicated to the processing of the present invention, hosts the initial documents at a specified location which allows the identification of the user of the initial documents. This unique location is represented by an access path in the structure of the files on the storage servers in the cloud computing (104). Each document is uniquely accessible, in the same manner that the initial document and has its unique name, its unique size, its own date and file type. This access, more precisely a web link, is then formatted to minimise its length and to redirect to an algorithm which verifies the properties of the said documents. This access path is also seen as a unique identifier. This identifier is then applied as a content of the matrix barcode generated by the system to later be added as a parameter of the document for its tagging process, in the same manner as the affixing positions of the QR code on the document.

Referring to FIG. 1, as a result, the document saved on a storage server (101-A) would include a QR code which will be visible on the printed version of the document. This QR code would include the path to the document on the server and security features of the document. Reading of said QR code by an appropriate reader such as a smart phone device (151), would allow other users to download (104-C) a copy of the document from the server to their personal devices (151). Several other users can access the same document using different viewing devices (151, 152, 153), such as tablet computers, handheld computers and Smartphone's.

Still referring to FIG. 1, it can be easily understood that the process server (105) and the web server (103) can be combined in the same physical server. For example the device may host both the Internet hosting platform which will handle user interactions and the process monitor (105-C) acting as a sub-process on the same server.

In yet other embodiment, web server (103) could be hosted within the storage server (104). For example, the Internet hosting platform may be hosted within a cloud server service, and store the initial file (101) and the tagged file (101-A) at other locations on the cloud server.

Figure 3:
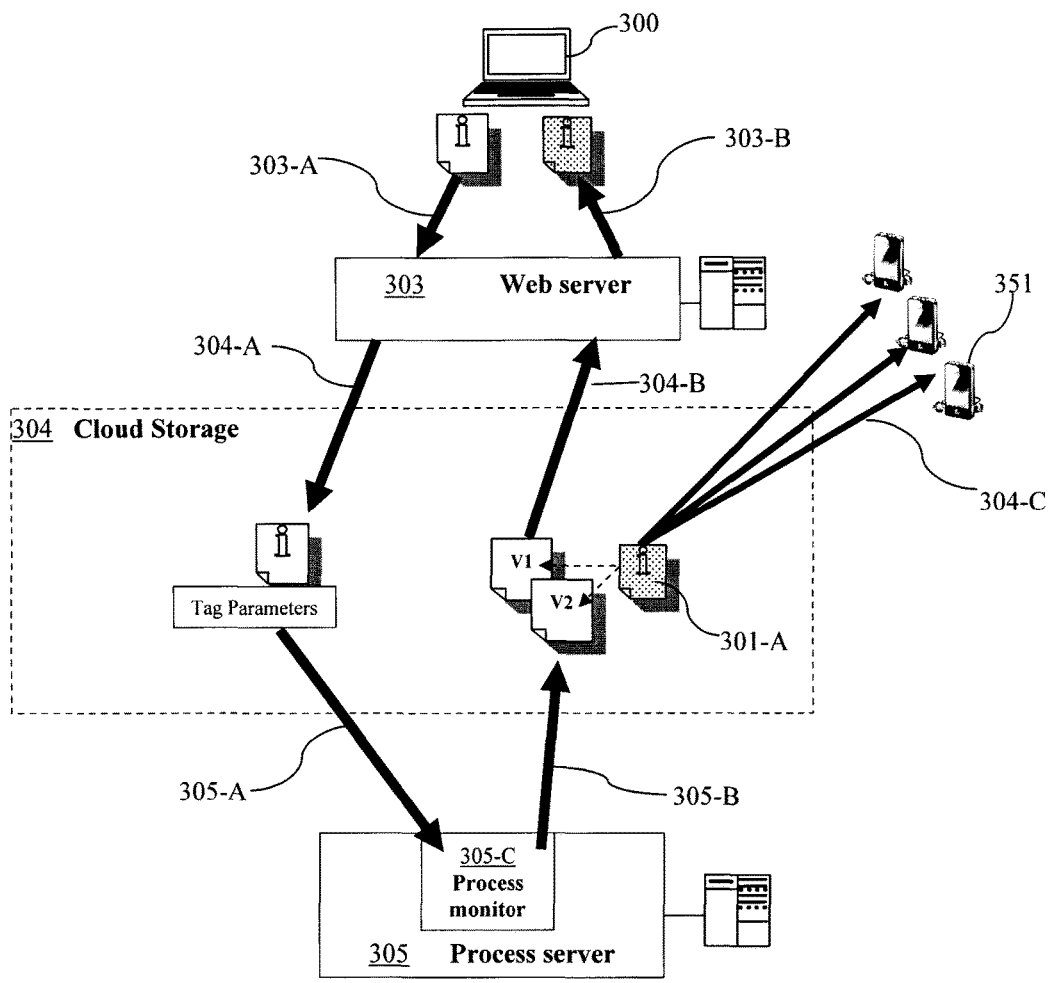
FIG. 3 is a schematic illustration of the method to tag a file in accordance with the present invention, wherein multiple versions of the documents or multiple documents from a common folder are available using a single matrix barcode.

FIG. 3 shows another preferred embodiment of the invention, whereas multiple versions of the documents are available using a single matrix barcode. The initial document is downloaded (303-A) from the document's owner computer (300) to the web server (303), and then downloaded (304-A) from the web server (303) to the storage server (304). The tagging process by the process monitor (305-C) operates as described hereinabove. A first version of the document is then made available in the storage server (304). Further versions of the same document can be transferred from the document's owner computer (300), or alternatively from another user's computer or device, to the storage server (304). The process monitor (305-C) uploads (305-B) the said further version of the document to the process server (350), and the second document is then tagged with the same matrix barcode as the initial document and placed back to the storage server (304). A user accessing the document through a device (351), when scanning the matrix barcode, will be presented with a web page for selecting the document version from all available versions (301-A), or alternatively, with several webpages for password validation, version selection and/or transfer mode selection (see the user access sub-process illustrated by FIG. 4 below). The document which is downloaded (304-C) to the device (351) corresponds to the version selected by the accessing user. As can be understood by a person skilled in the art, the process monitor (305-C) may attribute automatically different names to distinguish the different versions of the documents on the selection webpage. When presented with the web page for version selection (301-A), the user will be able to differentiate the different versions of the document.

Referring still to FIG. 3, in yet another embodiment of the invention, several documents from a common folder on the user's device are tagged and made available from a web page (301-A).

In all embodiments whereas several files are available from a single QR code which leads to a selection webpage, it may be desirable to have the process monitor add to the document not only the QR code, but also a human readable identifier, such as the name and/or the version number of the document. Such text could, for example, be added in the vicinity of the QR code to allow each user who has a printed version of a tagged document determine which exact document and document version they have in printed form.

Figure 4:
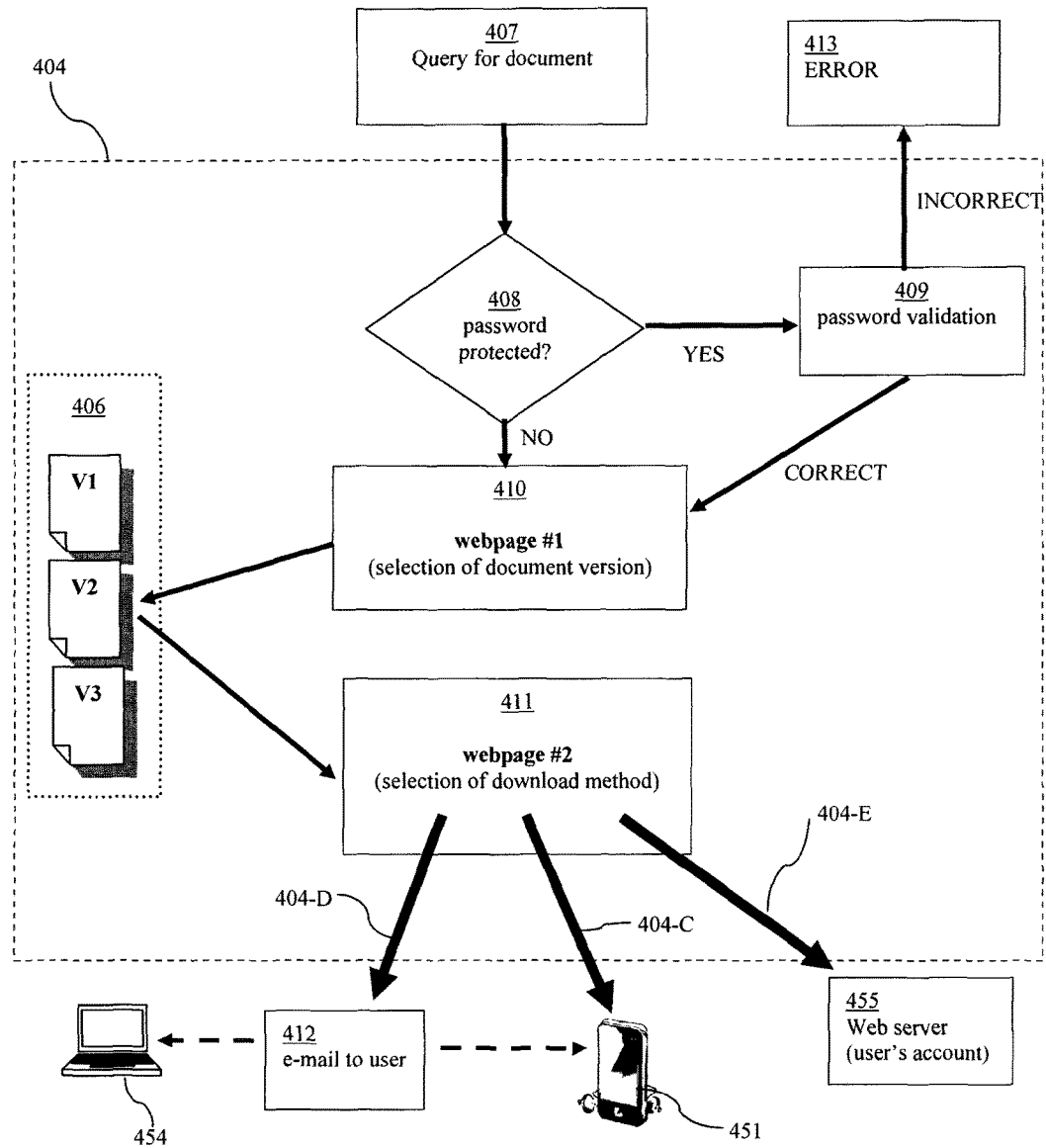
FIG. 4 shows a schematic diagram representing the password validation and version selection process whereas multiple versions of the documents are available using a single matrix barcode.

FIG. 4 shows details of the user access sub-process when multiple versions of the document are available, as used in some embodiments of the invention (the same sub-process applies if several different documents are made available from a same selection webpage). A user willing to access the document will have his viewing device scan the matrix barcode on a printed version of the tagged document. The device will then send a query (407) for the document to the storage server. The storage server will verify if the document is protected by a password (408). If the document is password-protected, then there will be a password validation process (409) that will require the user to supply the proper password. If the password is not correct, the user will be presented with an error message. However, if the password is correct, the user will be presented to a first webpage (410) where he will have to select the version of the document to be downloaded amongst all the versions of the document stored (406). Once the version selected, a second webpage (411) will allow the user to select the transfer method used to download the document file on his device. The document file, for example, can be downloaded directly (404-C) or sent by e-mail (412) to the user's e-mail account (404-D). E-mailed document can then be accessed by the user on the device used for the query (451), or on another device or computer (454). Also, the document can be added to an account hosted on the web server (404-E) whereas a user has access to the documents he downloaded through this account (455).

Still referring to FIG. 4, if the document is not password-protected, then the accessing user will directly have access to the web page to select the version of the document (410), and the selection of the transfer method (411) and the actual transfer to the user's device (404-C) will occur as described hereinabove.

In such embodiments, when a new version or a new document is made available on a selection webpage (410), a sub-process may send a notice of availability to users having accessed said tagged file previously to let them know of the availability of a new document or a new version. For example, in cases where the query for document has led to a document being transferred by e-mail (412), each e-mail address can copied in a database on the web server, or alternatively on the process monitor. Once a new document or a new version is made available from the same selection webpage (410), either the web server or the process monitor may send a notice of availability to each of these e-mail addresses.

Figure 5:
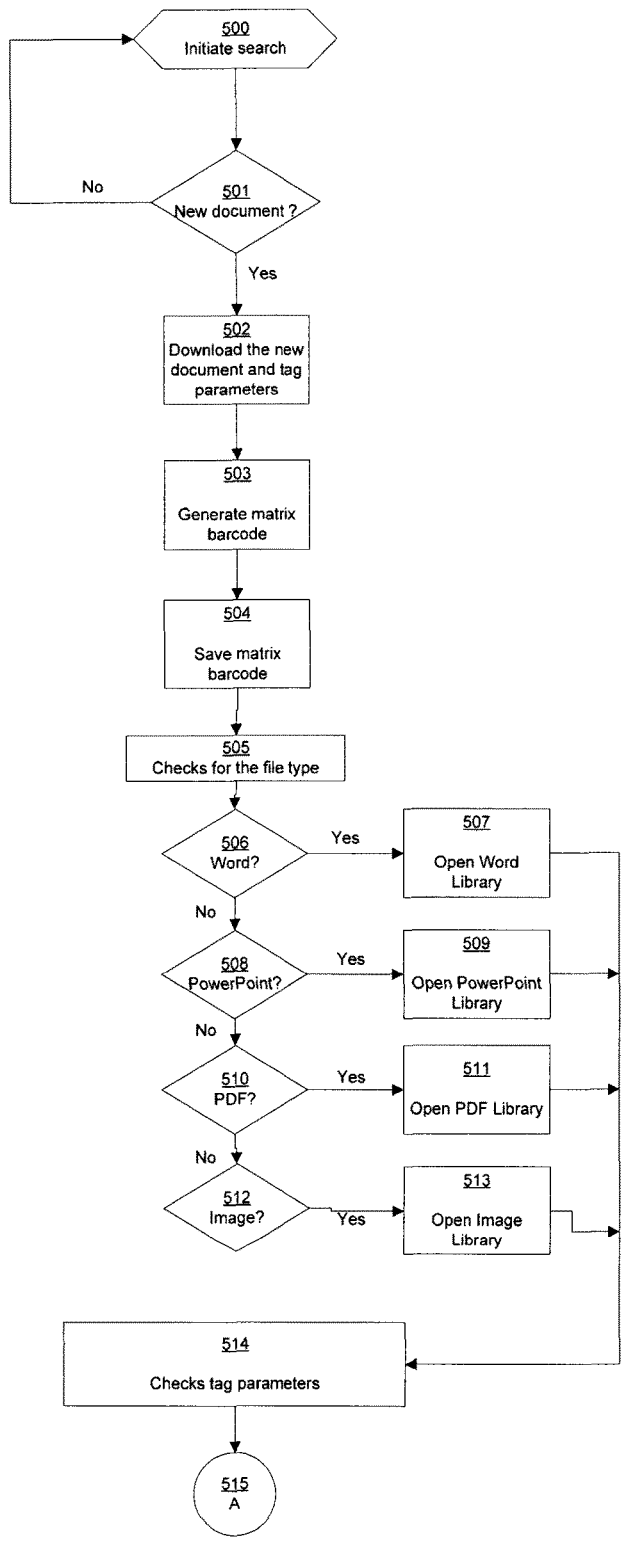
FIG. 5 shows a graphical representation of the sequence of actions required for the process monitor to tag document.

In a preferred embodiment, illustrated in FIG. 5, the process monitor continually or periodically search the database (500) to verify if a document needs be tagged (501). If no document is identified, the process monitor initiates a new search (500) for a document to be tagged. Therefore, the process monitor will perform periodical searches, and not other actions will occur until a document to be tagged is found. Once the document to be tagged is targeted (501), the monitor downloads the initial file with its tagging parameters on the process server, for example, Windows™ server (502), then the document is retrieved by the "monitor", it also retrieves the tagging parameters. First it retrieves the unique identifier which is an internet link (access path of the document) for the generation of the matrix barcode (503). When this matrix barcode has been generated, the monitor saves the image representing the matrix barcode on the server (504). The monitor analyses the file type of file which has to be tagged. This process is done using the file name extension (505). For example: if the file extension is .doc or .docx (506), the monitor may open the Microsoft.Office.Interop.Word library (507) or any of such library allowing similar operations for the purpose of the invention. If the file name extension is .ppt or .pptx (508), the monitor may open the Microsoft.Office.Interop.PowerPoint library (509). If the file name extension is .pdf (510), the web server may open its PDF library or the monitor's own library for PDF files (511). If the file name extension is .jpg, .jpeg, .png or .tif (512), the image-processing web server will use its image processing library or the monitor will call System.drawing (513) and for each document in other formats corresponding editing processor would be used. Once the file type identified, the process monitor verifies the tagging parameters as a function of the said file type (514) storing the information on tagging parameters and the opened library for further processing (515). As can be understood by a person skilled in the art, any library adapted to processing the file type of the document may be used, and specific libraries may be programmed as a function of specific file types or integrated within the process monitor.

Figure 6:
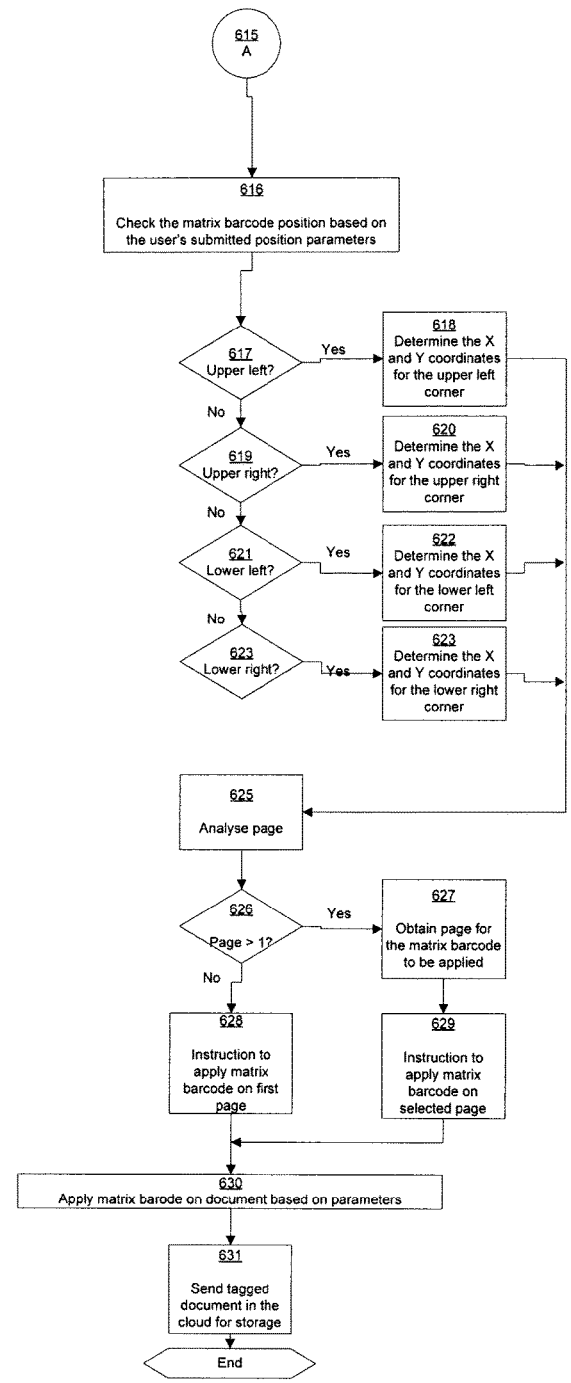
FIG. 6 shows a graphical representation of the sequence of actions required for the process monitor analyze the parameters of tagging of the document that is tagged by the process monitor.

Referring to FIG. 6, once the editing library is identified, the monitor opens the file of the document and affixes the matrix barcode at a specific location following the tagging parameters (616). Depending on the targeted location for the barcode (617,619,621 or 623), the process monitor determines the coordinates for affixing the matrix barcode on the page of the document (618, 620, 622 or 624). Then, a review of the code request page is done (625). If the number of the page is higher than one (626), the system will find the precise page (627). If it is not higher than one, the barcode will be applied on the first page only (628). Furthermore, the matrix barcode is applied on the document having as content the unique identifying Internet link (630). Once the file is tagged, it is then returned to the cloud storage server by the monitor (631). Referring back to FIG. 1, once the file is on the cloud storage server, the document appears as tagged (104-B) in the database (104). The invention provides an automated method to identify documents needing to be tagged, and documents that have been tagged.

Finally, the document remains available when the matrix barcode linked to the document is scanned and also when the owner of the document accesses it, using its web server user account (103-B).

Figure 7:
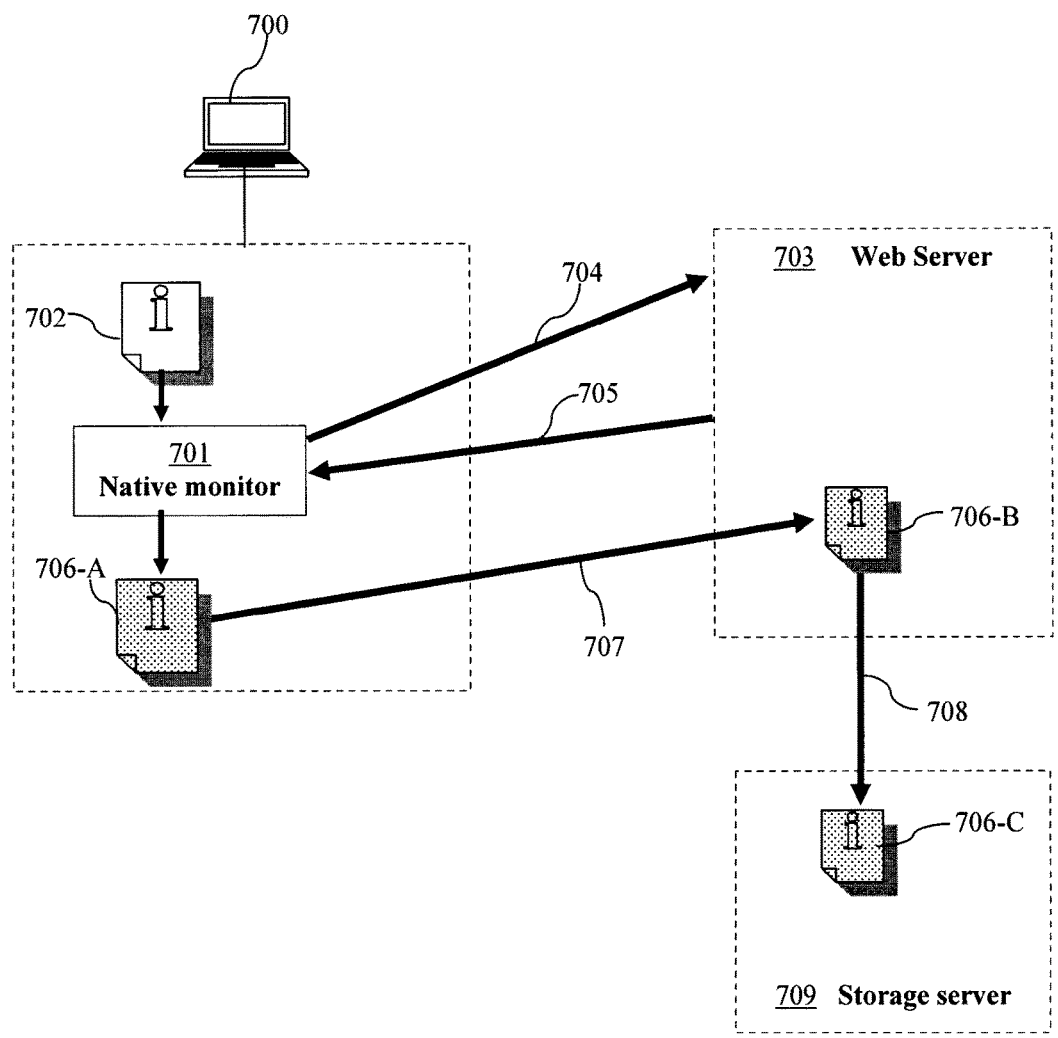
FIG. 7 shows a schematic illustration of the method to tag a file in accordance with the present invention, wherein a native monitor is used on the user's computer It should be noted that the invention is shown in a schematic form, for illustrative purposes only.

In yet another embodiment, illustrated in FIG. 7, the tagging process is also used within third party applications such as Microsoft Word™, Microsoft Powerpoint™ or ODT file editors on the computer used to create and edit the document (700). The user of the document can tag directly the document using an add-on feature represented as an icon in the third party application. The method can comprise the additional feature of installing the add-on feature on the edition software used, said add-on feature comprising a native monitor (701). The native monitor is therefore on the same computer (700) used for editing the file (702). When the user clicks on an icon to start the add-on feature within the third party application, then native monitor sends a query (704) to the web server, which sends back the information on the location where the tagged document will be on the storage server. The native monitor (701) then creates a matrix barcode corresponding the this information, and affix the QR code to the document, thus creating a tagged document (706-A) on the user's computer (700). The native monitor continues by downloading (707) a copy of the tagged document on the web server (706-B). The web server in turn downloads (708) its copy of the tagged document on the storage server (709), thus creating yet another copy of the tagged document on this storage server (706-C) at the previously determined hyperlink location. It is this copy on the storage server (706-C) that will be available for other users to access using the matrix barcode on printed versions of the document. The copy of the tagged document on the web server (706-B) may be deleted once the download is complete.

The native monitor generates a QR code and a hyperlink to access the tag document on the storage server through the use of said QR code. When the user saves the document in the editing software using the add-on feature, an electronic version is created containing the tag. This tagged document is then downloaded and saved on the storage server through the web server and the native monitor creates a temporary copy which will be saved on the local computer used for further editing the document.

With a current level of development in computers and network systems, it is possible to arrange the storage servers and monitors of the document marking system in any of the listed above arrangement or in a combination of those arrangement. Each part of said system can be locally or remotely positioned, depending on the security level, economical considerations and practical decisions understandable by a person skilled in the relevant art. For example, the marked document can be stored on the overseas server to reduce the cost of the document storage.

In its various embodiments, the present invention could be used, for example, for educational application. A teacher could bring a printed tagged document to his students. Only students interested to said information would then use a QR code reader to obtain a copy of the document, which can then be consulted by the students using any preferred device. Also, the QR code could point to a selection webpage from which students would be able to download several other documents related to the printed document they saw. A teacher could also provide multiple or updated versions of his courses to his students, by updating the document associated with the QR code or by making available a plurality of updated versions, including, for example, recent news events related to the taught subject.

In yet another example, a lecturer at a conference would show the QR code of his conference presentation to the audience, which would then be able to download a copy of the presentation. The QR code tag could be displayed on the presentation screen at different moment during the presentation. Alternatively, it could be printed on a separate sheet from the rest of the document, and therefore the QR code tag could be circulated amongst the viewers, or alternatively displayed on a computer or on any physical display made available for viewers to scan QR codes corresponding to the desired presentation. It would also be possible for the presenter to add new material associated to the QR code in real-time during his presentation. The Web server or the Process monitor could automatically generate a display of a plurality of QR code corresponding to a plurality of presentations, for example for a plurality of presentations on related topics or given at a same event. Afterward, if one of the members of the audience wants to share this presentation with another person, this member of the audience would only need to show the QR code of his own printed version to this other person for that person to obtain the presentation. Finally, all these persons would be able to access, using the same QR code, updated versions of the same presentation and other related documents made available by the lecturer on a selection webpage.

In other examples, documents which are prepared by police officers can be tagged with a QR code, with a plurality of security levels attached to a plurality of documents which are partially masked as a function of security level. In such case, a user with no or limited security access level will enter, when requested by the system, the low level security password. This user will then have only access to the heading of the document, the rest of the document being masked and blanked out. A user with intermediate security access level will enter a medium security password, providing him access to documents partially masked or blanked out, as a function of his level of security. A user with the highest security access level will have to enter a password that provides access to the complete document. For example, during an investigation, police officers would only give concerned people blanked out documents to protect the secrecy of their investigation (by giving a limited security access password to the document), while a judge at a trial could be given the highest level of security to view the full document.

The present disclosure includes all disclosures contained in the appended claims as well as disclosures in the foregoing description.

As many changes can be made to the preferred embodiment of the invention without departing from the scope thereof; it is intended that all matter contained herein be considered illustrative of the invention and not in a limiting sense.

What is claimed is:

1. A method of tagging a document for future access, the method comprising the steps of:
   (a) Saving a document on a storage server,
   (b) Having a process server which hosts a tagging process program,
   (c) Uploading said document from said storage server to said process server,
   (d) Accessing said document stored on said storage server by said tagging process program,
   (e) Having said tagging process program:
      (i) generate a tag referring to a location of said document on said storage server;
      (ii) add said tag to said document, while said tag being visible on a digital form and on a printed form of said document; and
   (f) Maintaining a list of versions of said document on said storage server by saving said document as a new version thereof on the storage server when modifications are made thereto,
   wherein, said tag can be scanned from any said form of said document by a device equipped with an optical scanner and as a result said document would be accessible to said device; wherein upon accessing said document comprising said tag, a selection webpage is presented comprising said list of versions of said document.

2. A method of tagging a document for future access, the method comprising the steps of:
   (a) hosting a file containing said document using an internet hosting platform;
   (b) associating tagging parameters to said file;
   (c) transferring said file and said associated tagging parameters from said internet hosting platform to a storage server;

(d) creating an entry in a database on said internet hosting platform identifying a location of said file on said storage server; and (e) monitoring said file and said tagging parameters by a process monitor, wherein said process monitor continuously searches in said database to identify said file to be tagged, and once the process monitor identifies said file to be tagged, the process monitor transfers said file to be tagged from said storage server to a process server;

(f) generating an access path to said file on said storage server using a web link;

(g) creating a barcode tag referring to said access path;

(h) inserting the barcode tag into said file according with said tagging parameters, wherein said barcode tag will appear on said document;

(i) transferring said file with an inserted barcode tag to said storage server at the location corresponding to said access path; and (j) uploading a new version of said document on said internet hosting platform when said document is modified; and (k) upon scanning said inserted barcode tag, presenting a selection webpage comprising a list of versions of said document.

3. The method of claim 2, wherein tagging parameters include access restriction parameters.

4. The method of claim 3, wherein said access restriction parameters include a user-defined password; and said method further comprising the step of providing access to said file located on said access path only to third party users providing said user-defined password.

5. The method of claim 3, wherein said barcode tag is a matrix barcode representing the hyperlink location of said document on said storage server.

6. The method of claim 5, further comprising the steps of:
reading said matrix barcode with an application for reading barcode on a viewing device;
said viewing device transferring said document from said access path; and displaying said document on said viewing device.

7. The method of claim 5, wherein said access restriction parameters include a user-defined password; and further comprising the steps of:
reading said matrix barcode with an application for reading barcode on a viewing device;
said viewing device requesting access to said document at said access path;
said storage server requesting said password from the viewing device;
said viewing device providing said password to said storage server;
said viewing device transferring said document from said access path; and
displaying said document on said viewing device.

8. The method of claim 2, wherein the steps (e), (f), (g), (h) and (i) are performed by an automated software application which operates on the process server.

9. The method of claim 8, wherein said barcode tag is a matrix barcode representing the hyperlink location of said document on said storage server.

10. The method of claim 2, comprising the step of:
(i') transferring said new version of said document from said Internet hosting platform to said storage server.

11. The method of claim 2, wherein said barcode tag refers to document location on said storage server; said storage server being associated with a hyperlink address and further comprising the steps of:
reading said barcode tag with an application for reading barcode on a viewing device;
said application concatenating said document location on said storage server from said barcode tag;
said application constructing said access path from said document location and said hyperlink address;
said viewing device transferring said document from said access path; and
displaying said document on said viewing device.

12. The method of claim 2, wherein said barcode tag refers to a reference in said database on said internet hosting platform; said reference in said database corresponds to said access path of said document; and further comprising the steps of:
reading said barcode tag with an application for reading barcode on a viewing device;
said application querying said internet hosting platform to obtain said access path of said document from said database;
said viewing device transferring said document from said access path; and
displaying said document on said viewing device.

13. The method of claim 2, wherein said barcode tag is selected from a group comprising matrix barcodes and single dimension barcodes.

14. The method of claim 2, further comprising the steps of:
(l) monitoring a transfer of said file with said inserted barcode tag from said storage server to a recipient;
(m) identifying the recipient of said transfer of said file;
(n) monitoring a transfer of a new version of said file with a new version of said inserted barcode tag to said storage server; and
(o) notifying the recipient of said new version of said file existing on said storage server.

15. A method of tagging a plurality of documents for future access, the method comprising the steps of:
(a) hosting a plurality of files each containing one of said plurality of documents using an internet hosting platform;
(b) associating tagging parameters to said files;
(c) transferring said files and said associated tagging parameters from said internet hosting platform to a storage server;
(d) creating an entry in a database on said internet hosting platform identifying the location of said files on said storage server;
(e) monitoring said files and said tagging parameters by a process monitor,
wherein said process monitor continuously searches in said database to identify said files to be tagged, and once the process monitor identifies said files to be tagged, the process monitor transfers said files to be tagged from said storage server to a process server;
(f) generating an access path for a selection webpage on said storage server using a web link;
(g) creating a barcode tag referring to the selection webpage;
(h) inserting the barcode tag into each said file according with said tagging parameters, wherein said barcode tag will appear on each said document;
(i) transferring said files with an inserted barcode tag to said storage server at the location corresponding to web links of said selection webpage;

(j) uploading a new version of one of said files on said internet hosting platform when said one of said files is modified; and (k) upon scanning said inserted barcode tag, presenting said selection webpage comprising a list of versions of said one of said files.

16. The method of claim 15, further comprising the steps of:

(l) monitoring a transfer of one of said files with said inserted barcode tag from said storage server to a recipient;

(m) identifying the recipient of said one of said files;

(n) monitoring a transfer of a new version of said one of said files with said inserted barcode tag to said storage server; and (o) notifying the recipient of said new version of said one of said files existing on said storage server.

\* \* \* \* \*